April 5, 1927.  1,623,100
F. M. DOLAN
SLICING BOARD.
Filed Feb. 5, 1925
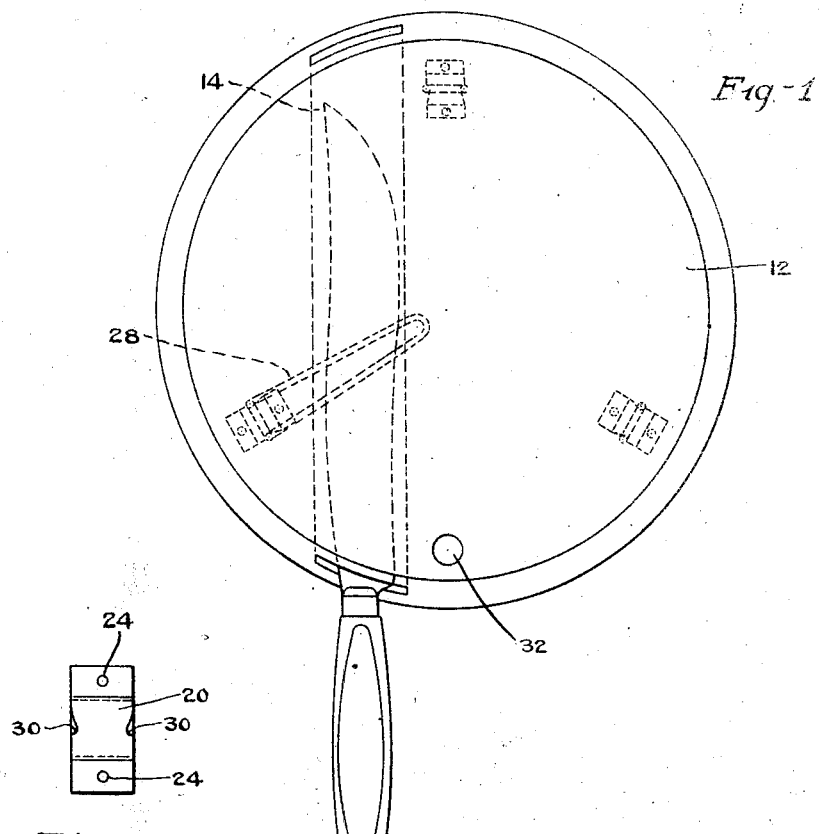
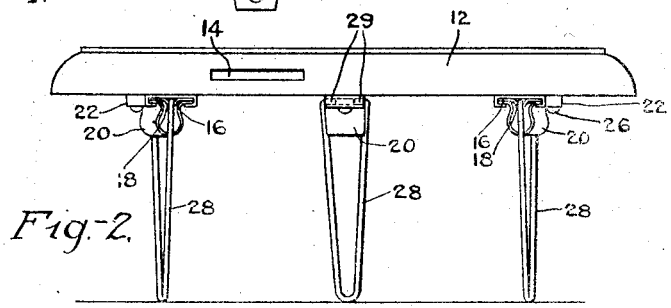
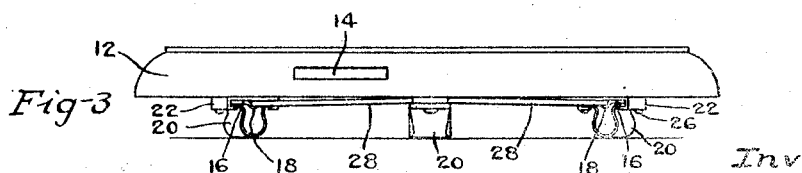
Inventor:
Francis M. Dolan.
By Whiteley and Rickman
Attorneys.

Patented Apr. 5, 1927.

1,623,100

UNITED STATES PATENT OFFICE.

FRANCIS M. DOLAN, OF ST. PAUL, MINNESOTA.

SLICING BOARD.

Application filed February 5, 1925. Serial No. 7,045.

My invention relates to slicing boards. An object of the invention is to provide a slicing board which is of attractive appearance and is provided with folding legs so that it can be set up on the dining table and the material on the board, such as cake or bread cut a single slice at a time as needed, whereby waste of the material will be eliminated.

The full objects and advantages of my invention will appear in connection with the detailed description thereof and the novel features embodied in my inventive idea will be particularly pointed out in the claim.

In the accompanying drawings which illustrate one form in which my invention may be embodied, Fig. 1 is a top plan view of the slicing board showing a knife in place in a recess therein. Fig. 2 is an elevational view showing the board supported on folding legs. Fig. 3 is an elevational view of the board with the legs folded. Fig. 4 is a detail plan view.

As shown in the drawings, I provide a board or flat piece 12 preferably formed from a single piece of wood. The board may be of any desired shape, although in the embodiment shown it is round. The board is provided with a recess 14 which constitutes a sheath for a knife. This recess lies entirely within the material of the board and is formed by cutting out the proper amount of material in any suitable manner.

Folding legs are attached to the bottom of the board by the following means:—A piece of metal 16 is bent centrally to provide a rounded recess 18. A second piece of metal 20 which is bent bow-shaped has its ends placed on the piece 16 and a third piece of metal 22 has its ends bent over and firmly pressed down on the ends of the other two pieces so that all three pieces are securely held together. The overlapping ends of the three pieces are provided with holes 24 for receiving screws 26. The folding legs are formed from V-shaped pieces 28 consisting of wire or similar rod-like material, the ends 29 of which are bent inwardly toward each other and inserted in the round recess 18 so that the springy nature of the branches of the legs cause these branches to impinge upon the two sides of the pieces 20 as will be understood from Fig. 2. The sides of the pieces 20 are inclined as best shown in Fig. 4 and the inclined portions terminate in stops 30. The board 12 is provided with a hole 32 by which it may be hung up when not in use.

The operation and advantages of my invention will now be obvious. The knife when not in use is sheathed in the recess 14 and hence is always conveniently at hand when it is desired to slice bread, cake, meat or other material placed on the board. The blade of the knife is protected when sheathed so that it is not liable to be dulled by contact with other metal particles and there is much less liability of getting the hands cut. When it is desired to cut the material at the dining table, the legs 28 are unfolded so that the board will be supported on the table in the position shown in Fig. 2. In this way, the material may be cut a slice at a time as needed which will minimize waste. At other times, the board can be used with the legs 28 folded and it will be supported slightly above the supporting surface by the projections to which the legs are pivoted. When the legs are unfolded, the tendency of the two branches to spring together when resting against the stops 30 prevents accidental folding of the legs, since force must be exerted to cause the folding operation. Since the three metal pieces 16, 20 and 22 are firmly held together, the legs will be securely attached to the board even if one of the screws should work loose.

I claim—

A slicing board comprising a flat piece of wood, a plurality of projections secured to the underside thereof, each of said projections consisting of a metal member bent downwardly to provide a rounded recess, a bow-shaped metal member having its ends engaging the ends of said first member and having inclined sides terminating in stops and a third metal member extending over said first member with its ends bent over the ends thereof and extending under the ends of said bow-shaped member, screws passing through the overlapping ends of said three members, and V-shaped legs of springy material having upper bent ends pivotally mounted in said rounded recesses, the branches of said legs yieldingly engaging said inclined sides.

In testimony whereof I hereunto affix my signature.

FRANCIS M. DOLAN.